(12) United States Patent
Johnson et al.

(10) Patent No.: US 11,921,075 B2
(45) Date of Patent: Mar. 5, 2024

(54) WICK FLUID SYSTEM

(71) Applicant: TSI Incorporated, Shoreview, MN (US)

(72) Inventors: Jason Paul Johnson, Saint Paul, MN (US); Steven Robert Stadler, Shoreview, MN (US); Juergen Spielvogel, Gondelsheim (DE); Nicholas James Haupt, Saint Paul, MN (US)

(73) Assignee: TSI Incorporated, Shoreview, MN (US)

( * ) Notice: Subject to any disclaimer, the term of this patent is extended or adjusted under 35 U.S.C. 154(b) by 123 days.

(21) Appl. No.: 17/596,811

(22) PCT Filed: Dec. 30, 2019

(86) PCT No.: PCT/US2019/068984
§ 371 (c)(1),
(2) Date: Dec. 17, 2021

(87) PCT Pub. No.: WO2020/256788
PCT Pub. Date: Dec. 24, 2020

(65) Prior Publication Data
US 2022/0244209 A1 Aug. 4, 2022

Related U.S. Application Data

(60) Provisional application No. 62/863,610, filed on Jun. 19, 2019.

(51) Int. Cl.
*G01N 27/22* (2006.01)
*G01N 27/12* (2006.01)

(52) U.S. Cl.
CPC ......... *G01N 27/227* (2013.01); *G01N 27/121* (2013.01)

(58) Field of Classification Search
CPC .......................... G01N 27/227; G01N 27/121
See application file for complete search history.

(56) References Cited

U.S. PATENT DOCUMENTS

2018/0113063 A1  4/2018 Kersten et al.

FOREIGN PATENT DOCUMENTS

| CN | 108535168 A | * | 9/2018 |
|---|---|---|---|
| JP | 2004061305 | | 2/2004 |
| JP | 2008020456 | | 1/2008 |
| JP | 2018509637 | | 4/2018 |
| KR | 20170023366 A | | 3/2017 |

(Continued)

OTHER PUBLICATIONS

"International Application Serial No. PCT/US2019/068984, International Search Report dated Apr. 30, 2020", 4 pgs.

(Continued)

*Primary Examiner* — Feba Pothen
(74) *Attorney, Agent, or Firm* — Schwegman Lundberg & Woessner, P.A.

(57) ABSTRACT

A system includes a polymer bag, a fluid network, a saturation block, and a wick. The polymer bag has a sealed envelope and a fitment. The fluid network is coupled to the fitment. The saturation block has a fluid inlet coupled to the fluid network and has a wick chamber. The wick is configured for disposition in the wick chamber.

19 Claims, 5 Drawing Sheets

(56) References Cited

FOREIGN PATENT DOCUMENTS

| | | |
|---|---|---|
| WO | WO-2016137962 A1 | 9/2016 |
| WO | 2017165671 | 9/2017 |
| WO | WO-2020256788 A1 | 12/2020 |

OTHER PUBLICATIONS

"International Application Serial No. PCT/US2019/068984, Written Opinion dated Apr. 30, 2020", 8 pgs.

"European Application Serial No. 19842736.1, Response to Communication pursuant to Rules 161(1) and 162 EPC filed Aug. 2, 2022", 11 pgs.

"Japanese Application Serial No. 2021-576113, Notification of Reasons for Refusal dated Dec. 19, 2022", w English Translation, 9 pgs.

"International Application Serial No. PCT US2019 068984, International Preliminary Report on Patentability dated Dec. 30, 2021", 10 pages.

"Japanese Application Serial No. 2021-576113, Response filed Mar. 20, 2023 to Notification of Reasons for Refusal dated Dec. 19, 2022", w/ English claims, 8 pgs.

"Korean Application Serial No. 10-2022-7001436, Notice of Preliminary Rejection dated Aug. 28, 2023", w/ English Translation, 11 pgs.

\* cited by examiner

WICK FLUID SYSTEM

CROSS-REFERENCE TO RELATED APPLICATION

This application is a U.S. National Stage Filing under 35 U.S.C. § 371 from International Application No. PCT/US2019/068984, filed on Dec. 30, 2019, and published as WO2020/256788 on Dec. 24, 2020, which claims the benefit of priority to U.S. Provisional Patent Application Ser. No. 62/863,610, filed on Jun. 19, 2019; the benefit of priority of each of which is hereby claimed herein, and which applications and publication are hereby incorporated herein by reference in their entireties.

TECHNICAL FIELD

This document pertains generally, but not by way of limitation, to a condensation particle counter (CPC).

BACKGROUND

Counting airborne particles is an important part of many industrial processes. For example, semiconductor fabrication and medical device manufacturing are often equipped with counting equipment.

A condensation particle counter uses the principle of supersaturation to promote droplet growth on a surface of a suspended solid particle. Scattered or absorbed light provides an electrical signal that can be transformed into a numerical count of particles.

Supersaturation entails a temperature change and delivery of a working fluid in a chamber. A typical particle counter includes a fluid supply holding a consumable quantity of working fluid. Present methods for servicing the fluid supply are inadequate, commonly subject to contamination, and often servicing the fluid supply is an origin of measurement error.

SUMMARY

The present inventors have recognized that a vented reservoir for working fluid in a condensation-based particle counter can cause problems with contamination. For example, with a gravity feed system, or with some pumping systems using a vented bottle, air can come into contact with the working fluid. The present subject matter includes an example in which the reservoir is closed and shut off from the environment and configured to easily store or transport working fluid to the wick or to a CPC system.

In one example, the working fluid can be transported separately from the CPC device and can be attached or detached at regular intervals. The working fluid is contained in a reservoir. The reservoir is sealed to protect the fluid from environmental contaminants that can impair the shelf life of the fluid.

In one example, the reservoir is collapsible and is unvented. Working fluid can be pumped until the reservoir is empty and the envelope is collapsed. The solution addresses problems associated with vapor lock, contamination, issues with priming pumps, false counts in the CPC, and other known problems. In one example, the working fluid is alcohol and the CPC is configured to "drip" the alcohol on the outer surface of the wick. One example includes monitoring for alcohol with a small sensor configured to detect a small volume at the lowest point in the wick chamber.

One example of a reservoir includes a plastic or foil bag or pouch with a suitable connector. Working fluid can include isopropanol.

Each of these non-limiting examples can stand on its own or can be combined in various permutations or combinations with one or more of the other examples.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
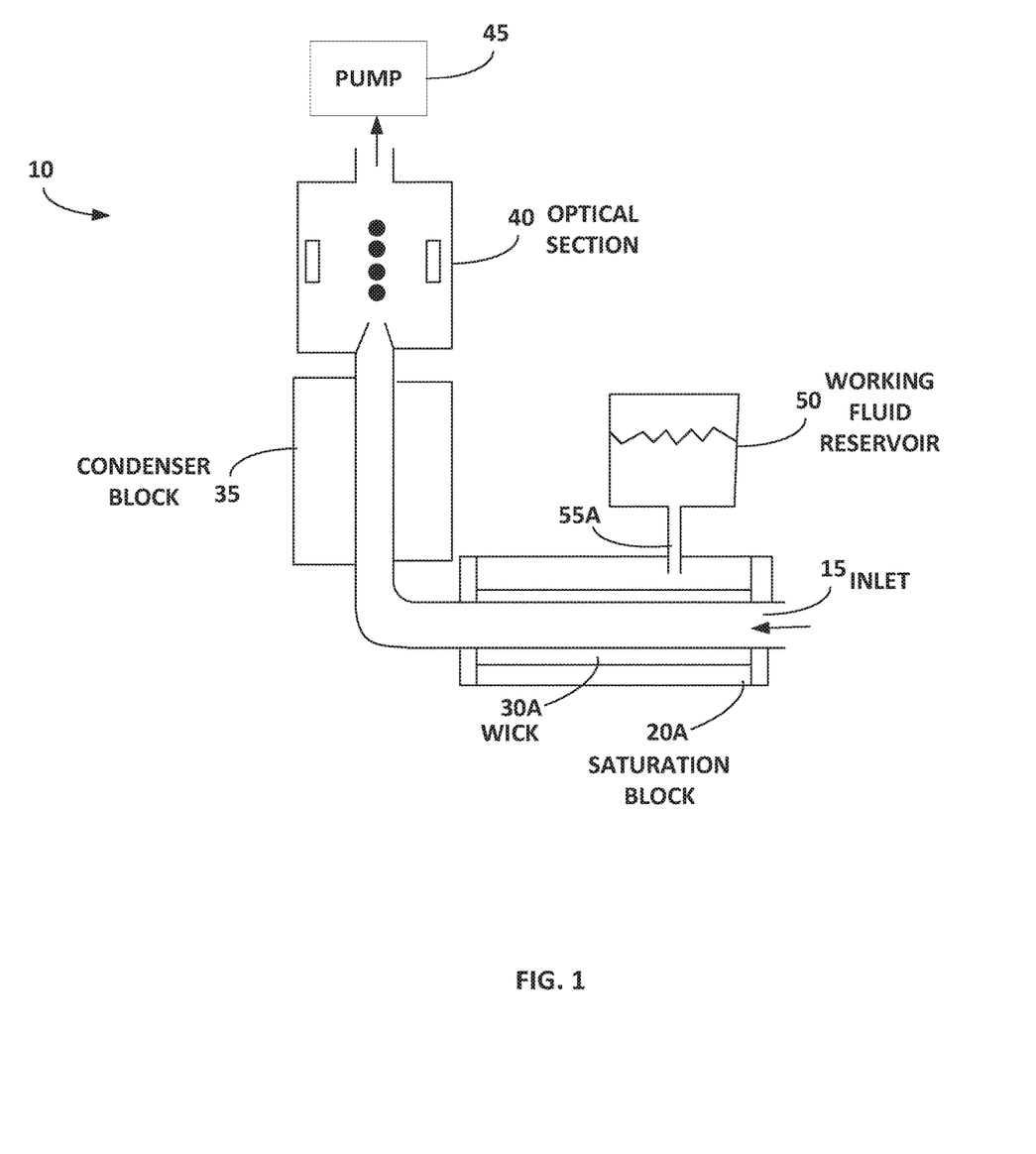
FIG. 1 illustrates a schematic of an example of a condensation particle counter, according to one example.

FIG. 1 illustrates a schematic of a condensation particle counter 10, according to one example. The counter 10 is configured to count particles in an air flow, here delivered to the air inlet 15. The air inlet 15 is delivered to a passageway of a saturation block 20A. The saturation block 20A is maintained at a first temperature. A wick 30A is disposed within a wick chamber of the saturation block 20A. The wick 30A includes a porous media. The wick 30A is wetted by working fluid supplied from reservoir 50. The working fluid reservoir 50 is coupled, by fluid line 55A, to a fluid port of saturation block 20A.

Incoming air is routed through saturation block 20A and thereafter, to a condenser block 35. The condenser block 35 is maintained at a second temperature, different than the first temperature. After passing through the condenser block 35, the air is passed through a discharge nozzle into optical section 40. Optical section 40 can include a light emitter, such as a laser, and a light detector. Air is drawn into counter 10, through saturation block 20A, through condenser block 35, and into optical section 40 by pump 45.

The working fluid provided to wick 30A can include alcohol, water, or other fluid. The first temperature and the second temperature are selected according to the particle size to be counted and the material properties of the working fluid supplied to wick 30A.

Figure 2:
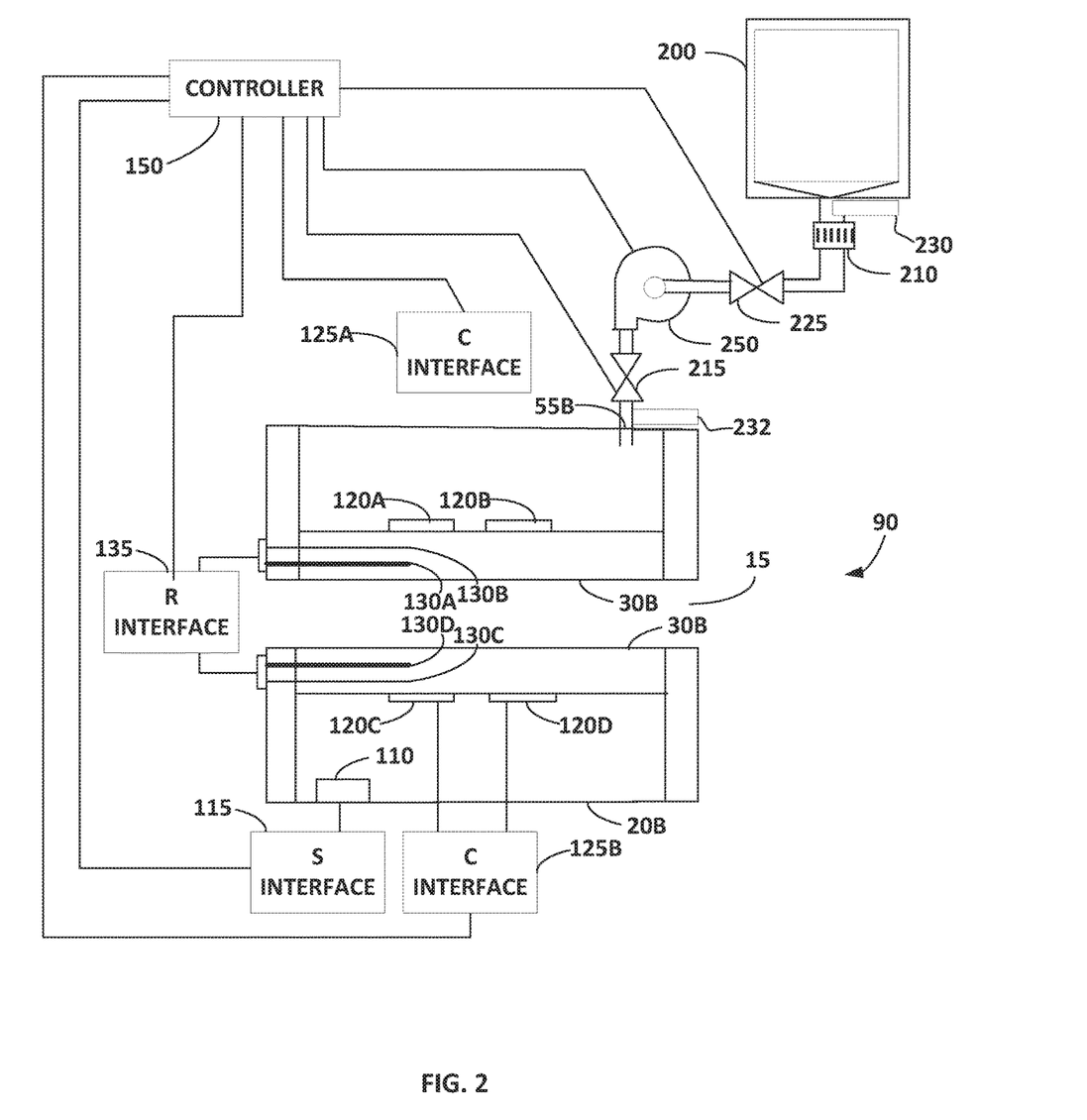
FIG. 2 illustrates an example of a wick system, according to one example.

FIG. 2 illustrates an example of wick system 90, according to one example. A system 90 includes wick 30B carried by saturation block 20B. Air under test enters through air inlet 15 on the right side of wick 30B and exits on the left side of the image. The system 90 includes working fluid reservoir 200 and a fluid network including coupler 210, valve 225, pump 250, valve 215, and line 55B coupled to an input port on saturation block 20B. In one example, system 90 includes one or more sensors 230, 232, The sensors 230, 232, individually or in combination, help determine whether fluid is present in the reservoir 200 or other location in the fluid network. The locations of the sensors 230, 232 are merely an example and the sensors 230, 232 can be located elsewhere in the fluid network. The sensors 230, 232 can include one or more of a resistivity sensor, a presence sensor, a sensor that indicates a connection is made (e.g., hall effect sensor, force sensor, piezoelectric sensor, or electrical interconnect, such as a switch or open circuit, that complete a circuit when a proper connection is made), moisture sensor, or the like.

A saturation block 20B and wick 30B are fitted with sensors. For example, capacitance interface 125A and capacitance interface 125B are coupled to electrodes 120A, 120B and to electrodes 120C, 120D, respectively. In addition, capacitance interface 125A and capacitance interface 125B are coupled to controller 150. Electrodes 120A, 120B, 120C, and 120D are configured as plates on selected surfaces of wick 30B. Capacitance between two plates is a function of the material in the gap. The material in the gap is a mix of dielectric materials including fluid, air, and other materials between the electrodes of the capacitance interface 125A, 125B. In one example, the amount of working fluid infused in wick 30B can be detected by monitoring the capacitance across selected electrodes. A controller 150 can include a processor configured to execute an algorithm to determine a measure of capacitance which correlates with a fluid level in wick 30B.

Another example of a sensor fitted to saturation block 20B and wick 30B is a resistance sensor. A resistance interface 135 is coupled to probes 130A, 130B, 130C, and 130D that are configured as needles to penetrate a portion of wick 30B. The probes 130A, 130B, 130C, and 130D can be selectively energized and a current can be induced through wick 30B. The resistance measured across probes 130A, 130B, 130C, and 130D is a function of conductivity therebetween. A measure of electrical resistance can provide a measure of fluid level in wick 30B.

A moisture sensor 110 is coupled to saturation block 20B and coupled to sensor interface 115 which in turn, is coupled to controller 150. The sensor 110 can include any combination of a capacitance sensor, a resistance sensor, optical sensor, or other sensor configured to provide a measure of fluid in wick 30B.

The controller 150 is coupled to selected elements of system 90. The controller 150 can execute an algorithm to selectively modulate or control various components in response to measured values detected on selected inputs. The controller 150 can include a memory device or storage platform as well as a user interface (including keyboard or mouse and a display) and a network interface (including wireless or wired network).

A reservoir 200 includes a ventless, fluid-tight envelope configured with a fitment. Here, the fitment includes a fluid spout having external threads. A coupler 210 includes corresponding internal threads and is configured to provide a fluid-tight seal. The reservoir 200 is fabricated of a flexible polymer, such as mylar, and as fluid is drawn off, the reservoir dimensions collapses and distorts. The reservoir 200 is configured without an external vent.

The system 90 includes the sensor 110, probes 130A-130D, and electrodes 120A-120D. In other examples, it will be appreciated that system 90 can include a single sensor, a single pair of resistance sensor probes, or a single pair of capacitance electrodes. Similarly, on other examples, the system 90 includes fewer components then that which is shown. For example, the system 90 can include a pump and omit the illustrated valves or can include a valve and omit a pump.

Figure 3:
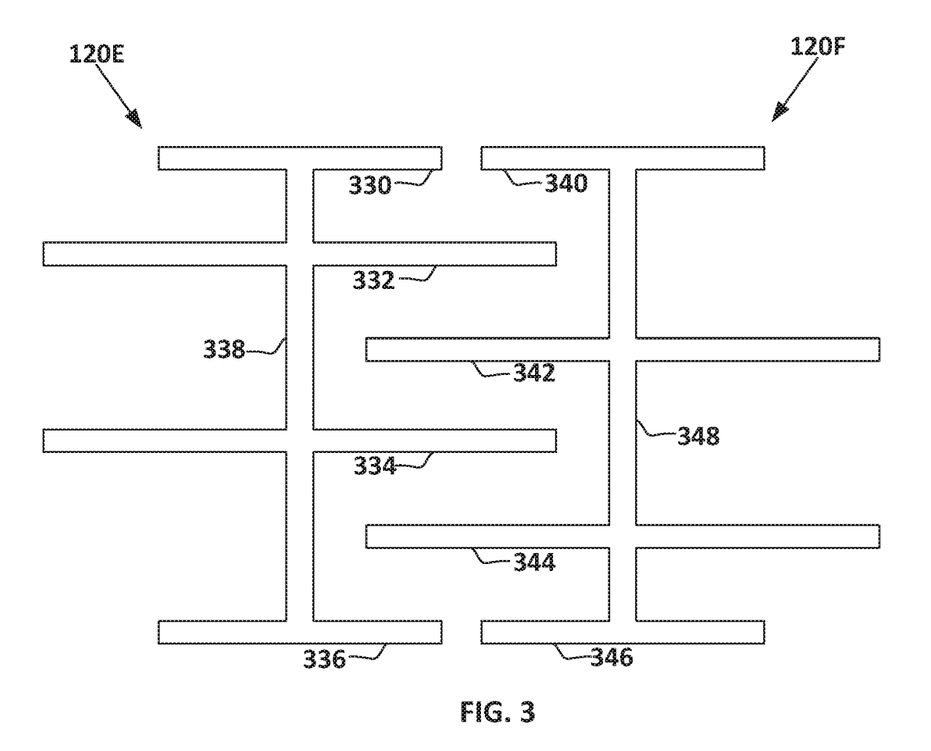
FIG. 3 illustrates an example of an interdigitated capacitance sensor, according to one example.

FIG. 3 illustrates an example of electrodes 120E, 120F. The electrodes 120A, 120B, 120C, 120D can be configured same or similar to the electrodes 120E, 120F. The electrodes 120E, 120F are sometimes called interdigitated electrodes. The interdigitated electrodes can help determine capacitance. The appendages of the electrodes 120E, 120F are spaced apart by a dielectric and changes in a fluid passing over (or near) the electrodes 120E, 120F can be detected by a capacitance change. The electrode 120E includes an electrically conductive material (e.g., copper, gold, tin, aluminum, the like, or a combination thereof) comprising a backbone 338 and appendages 330, 332, 334, 336 extending therefrom. The appendages 330, 332, 334, 336 as illustrated extend perpendicular from the backbone 338. The appendages 330, 332, 334, 336 as illustrated extend from both sides of the backbone 338. The appendage 330 caps a first end of the backbone 338. The appendage 336 caps a second end of the backbone 338. The second end is opposite the first end.

The electrode 120F is similar to the electrode 120E with the electrode 120F including appendages 342, 344 interleaved between appendages 332, 334, 336. The electrode 120F, similar to the electrode 120E, includes a conductive material comprising a backbone 348 and appendages 340, 342, 344, 346 extending therefrom. The appendages 340, 342, 344, 346 as illustrated extend perpendicular from the backbone 348. The appendages 340, 342, 344, 346 as illustrated extend from both sides of the backbone 348. The appendage 340 caps a first end of the backbone 348. The appendage 346 caps a second end of the backbone 348. The second end is opposite the first end.

The electrodes 120E, 120F, in some examples, are circumferentially wound about the wick 30B. The electrodes 120E, 120F sample a wider area of the wick 30B for moisture as compared to a solid plate or other, less expansive capacitance sensor. The electrodes 120E, 120F thus provide a more accurate capacitance value and indicates more accurately an amount of fluid on the wick 30B.

Figure 4:
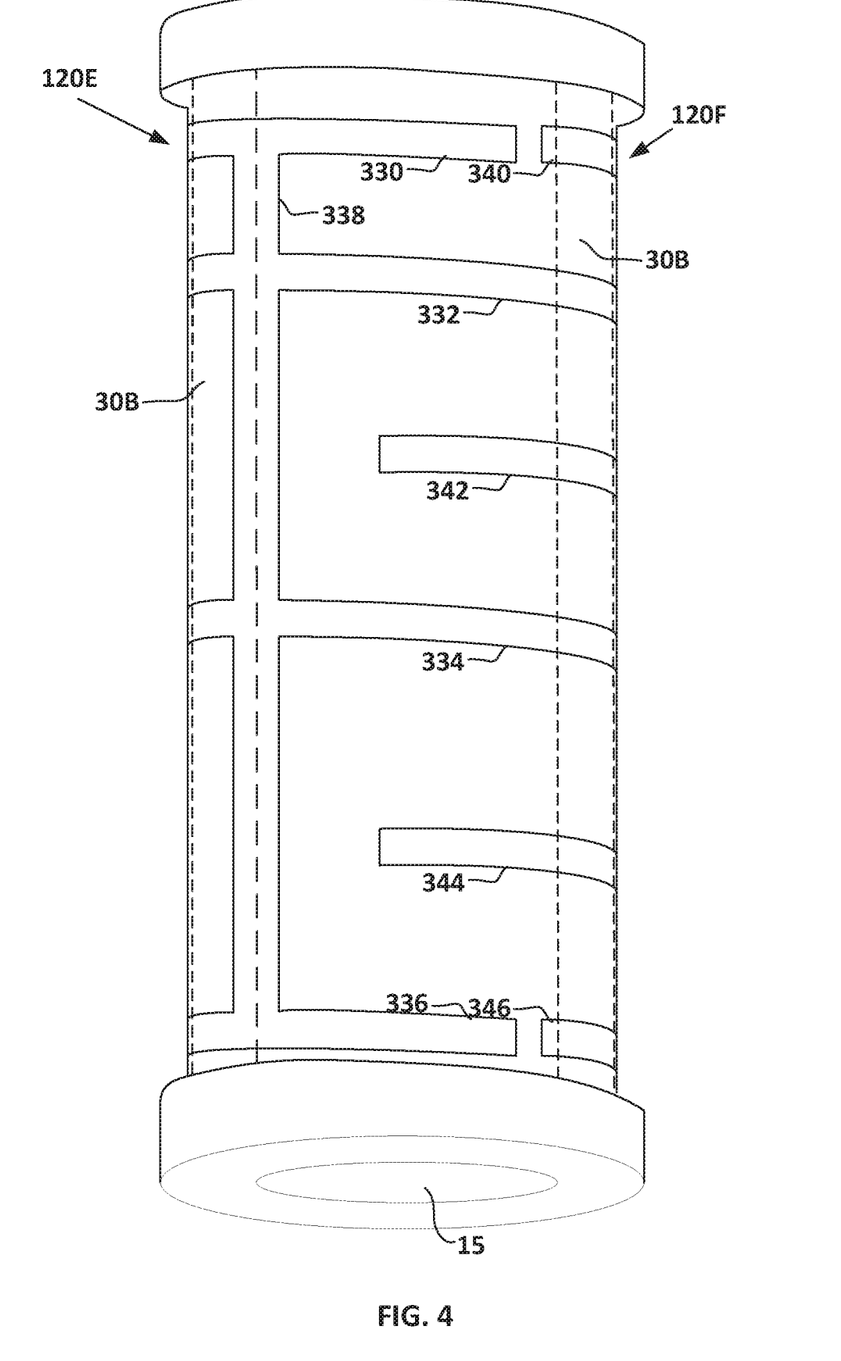
FIG. 4 illustrates an example of the interdigitated capacitance sensor circumferentially wound about a wick.

FIG. 4 illustrates an example of a perspective view diagram of electrodes 120E, 120E circumferentially wound about the wick 30B. As the wick 30B absorbs liquid from the reservoir 200, through the fluid network, the capacitance value read by the electrodes 120E, 120F changes. This capacitance value can be used to determine an amount of fluid on the wick 30B.

Figure 5:
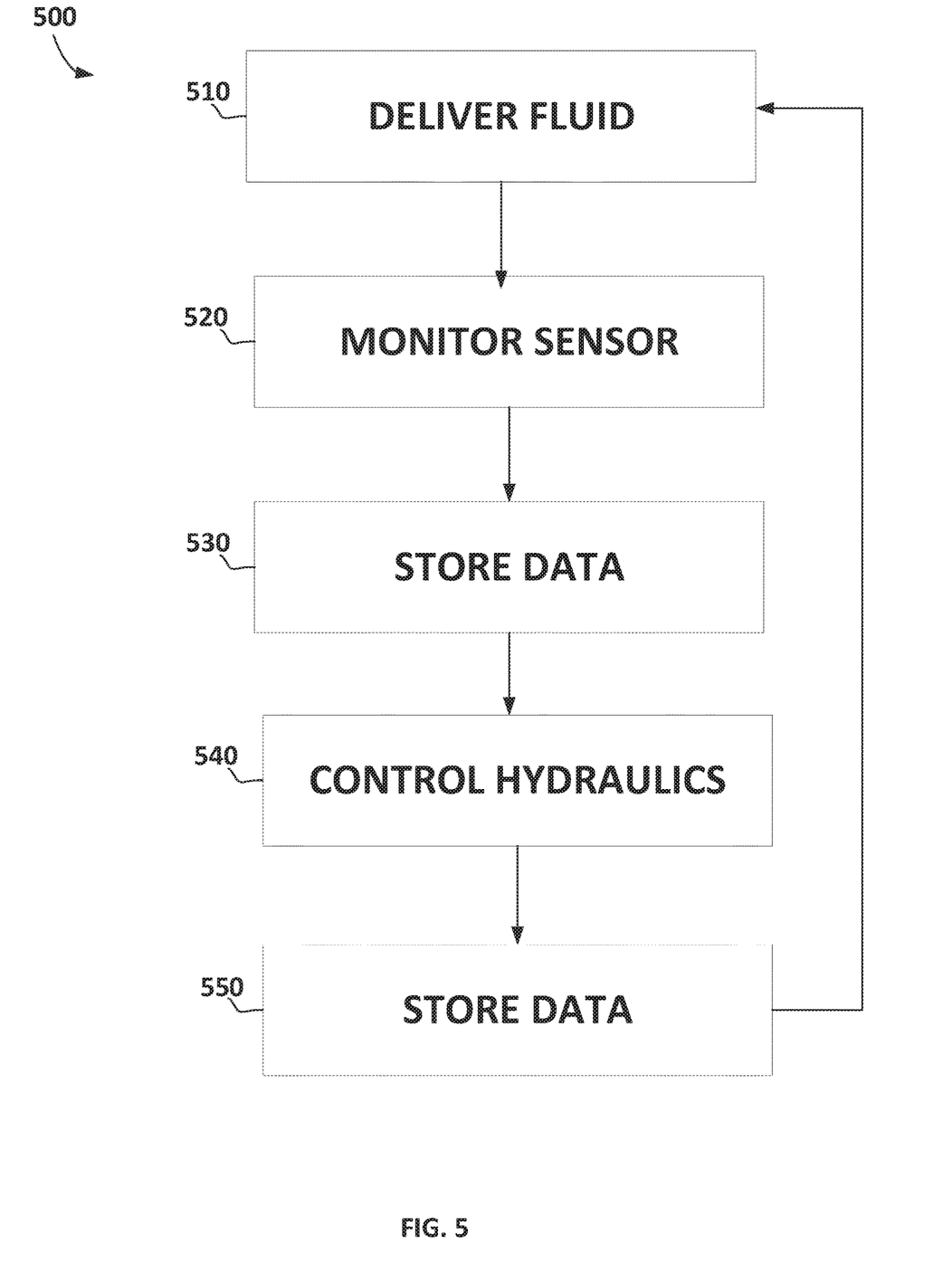
FIG. 5 illustrates an example of a flowchart of a method, according to one example.

FIG. 5 illustrates an example of a flowchart of method 500, according to one example. At 510, method 500 includes delivering fluid. In one example, the fluid is delivered from a closed reservoir, through a fluid network including valves and a pump, and into a saturation block and to a wick.

At 520, method 500 includes monitoring a sensor. The sensor can include a capacitance sensor having a plurality of electrodes or plates, a resistance sensor having at least one conductive probe, a moisture sensor, or other type of sensor. At 530, method 500 includes storing data in a memory. The stored data can be the basis for a notification to a user or operator. In one example, the stored data is maintained for archival purposes.

At 540, method 500 includes controlling hydraulic elements of a wick system. Hydraulic elements can include a valve (such as valve 215 or valve 225), a pump (such as pump 250), coupling lines, pressure regulators, or other components.

At 550, method 500 includes storing data. Data can be stored in a memory and as a function of the memory contents, an alert or message can be provided to a user or operator. The message can call for replenishment of a working fluid or alert as to a condition of an element of system 90.

As indicated, processing according to method 500 includes returning to 510 at which working fluid is delivered on an as-needed basis. Other configurations of methods are also contemplated.

Various Notes

Various examples of the present subject matter entail methods and apparatuses for storing, transporting, and delivering working fluid to a condensation particle counter and an associated sensor to determine working fluid fill state, capacity, and wick condition.

In one example, a collapsible container of working fluid (such as isopropanol, water, ethanol, butanol, propylene glycol, etc.) serves as a reservoir. The reservoir can be capped, sealed, stored, and transported, and can mate with a connector that is in turn attached to tubing and a liquid pump. The liquid pump can provide isolation of the reservoir and fluid from parts of the system downstream of the pump. A valve can be provided upstream, downstream, or valves can be provided both upstream and downstream of the pump for additional isolation. The pump can be configured to transport working fluid from the unvented, collapsible container to the outer surface of a wick of a condensation particle counter (CPC) that is mounted at an angle to the ground. The working fluid wets the entirety of the wick, via pumping, until it is fully saturated.

The working fluid content of the wick can be sensed by various sensors and associated methods. For example, according to one method, when the wick is full, an additional dose of working fluid from the pump can flow from the saturated wick to the lowest point in the system at which a sensor contact sensor is installed. The sensor can provide a signal to the pump control system to indicate that the wick is saturated and can trigger an instruction to cease pumping (or remove supply power to the pump), In one example, the pump output is metered.

In one example, needle-like probes are inserted in the wick at a location distal from the will fill port. The electrical resistance of the wick between these probes is measured. When the wick is whetted at the far end, there is a noted decrease in resistance which indicates the wick is whetted from one end to another.

In one example, the wick is surrounded by a non-contact capacitance probe, at one or more ends, on its sides, etc. The sensor, effectively two conductive electrodes or surfaces, is used to measure the capacitance of the wick and any fluid contained therein. With a wick of a known capacity, the proper amount of working fluid may be added to prevent flooding. A sensor can also discriminate the individual doses of working fluid that are added and can monitor the consumption of working fluid in the wick.

One example entails monitoring the use time and fluid flow through the wick. Sensor signals, in conjunction with a suitable algorithm for filling the wick either continuously or when attached to a reservoir or docking station, can signal the status of the CPC system and provide a measure of wick condition.

The reservoir, according to one example, is ventless. Rather than a vent to atmosphere, the reservoir includes a collapsible polymer (such as mylar) bag or envelope. The sidewalls of the reservoir collapse with fluid removal.

The absence of a vent in the collapsible reservoir prevents contamination by ambient gases, humidity and other substances so the potentially disposable working fluid container can be installed and used for extended periods of time. The action of the pump to isolate the working fluid, and to pump a metered dose to the exterior of the wick, serves to minimize flooding and zero count issues for the CPC.

In one example, the pump is self-priming, pump air bubbles, and can prevent a variety of other transport problems. In one example, the metering of the pump can be used to track the consumption of the working fluid and notify, the user when to refill.

One example of the present subject matter facilitates transporting working fluid to a CPC system.

One example of the present subject matter is configured to monitor and detect when the CPC wick is full of fluid, without employing a large reservoir that is subject to pressure effects, flooding, and contaminating other parts of the CPC when tipped.

One example of the present subject matter allows hygroscopic working fluids to be used with a CPC for extended periods of time. The collapsible reservoir ameliorates the need for venting. In one example, the pump, rather than a valve or gravity feed pump, can reduce or eliminate degradation of the working fluid. The working fluid can be degraded by contact with contaminants (such as water or humidity, gaseous species, soot and the like).

One example of the present subject matter provides a long-term supply of working fluid that is easy to change for the end user. One example provides working fluid storage capacity that exceeds a day interval.

One example of the present subject matter provides a means for transporting the working fluid, separate from the instrument, yet adapting to the instrument quickly.

One example of the present subject matter provides controls to prevent overfilling of the working fluid.

One example of the present subject matter allows for spare usage of working fluid, so that any spill or pressure related shedding of liquid can be absorbed without flooding flow components.

One example of the present subject matter is configured to isolate the pressure in the working fluid reservoir from the pressure within the CPC, to prevent flooding when fill occurs.

One example of the present subject matter is configured to provide metered dosing of the working fluid. One example of the present subject matter is configured to monitor and quantify wick condition.

Various examples of the present subject matter can be deployed in work concerning aerosol research, engine exhaust measurement, health and safety, pharmaceuticals; clean rooms, and other applications utilizing CPC technology.

The above description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A system comprising:
   a polymer bag having a sealed envelope and a fitment;
   a fluid network coupled to the fitment;
   a saturation block having a fluid inlet coupled to the fluid network and having a wick chamber;
   a wick configured for disposition in the wick chamber; and
   a capacitance sensor circumferentially wound about the wick.

2. The system of claim 1 wherein the wick includes a porous media.

3. The system of claim 1 wherein the sealed envelope is leakproof.

4. The system of claim 1 wherein the fitment includes a spout.

5. The system of claim 4 wherein the spout includes external threads.

6. The system of claim 1 wherein the fluid network includes a threaded coupler configured to engage the fitment.

7. The system of claim 1 wherein the fluid network includes a first hydraulic valve.

8. The system of claim 1 wherein the fluid network includes a hydraulic pump.

9. The system of claim 1 further including a controller coupled to the hydraulic network.

10. The system of claim 1 further including a sensor coupled to the wick.

11. The system of claim 10 further including a controller coupled to the capacitance sensor.

12. The system of claim 11 wherein the capacitance sensor includes first and second conductive structures with appendages, appendages of the first conductive structure interleaved with appendages of the second conductive structure.

13. A method comprising:
    providing a fluid flow from a sealed envelope to a wick in a condensation particle counter;
    monitoring, by a capacitance sensor circumferentially wound about the wick, fluid at the wick; and
    controlling the fluid flow based on the fluid at the wick.

14. The method of claim 13 wherein providing the fluid flow includes opening a hydraulic valve.

15. The method of claim 13 wherein providing the fluid flow includes powering a hydraulic pump.

16. The method of claim 13 wherein monitoring fluid flow at the wick includes measuring electrical capacitance.

17. The method of claim 13 wherein controlling the fluid flow includes executing an algorithm using a processor.

18. The method of claim 13 wherein controlling the fluid flow includes modulating a position of a hydraulic valve.

19. The method of claim 13 wherein controlling the fluid flow includes controlling a hydraulic pump.

* * * * *